UNITED STATES PATENT OFFICE.

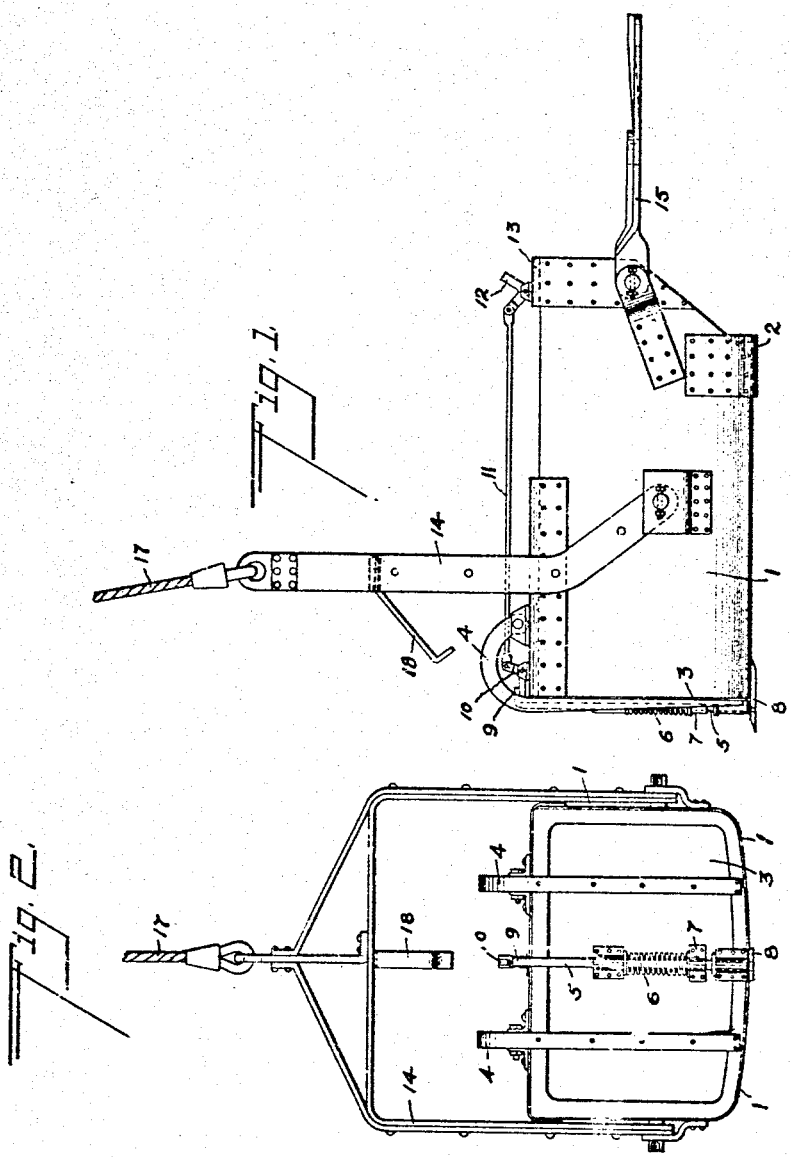

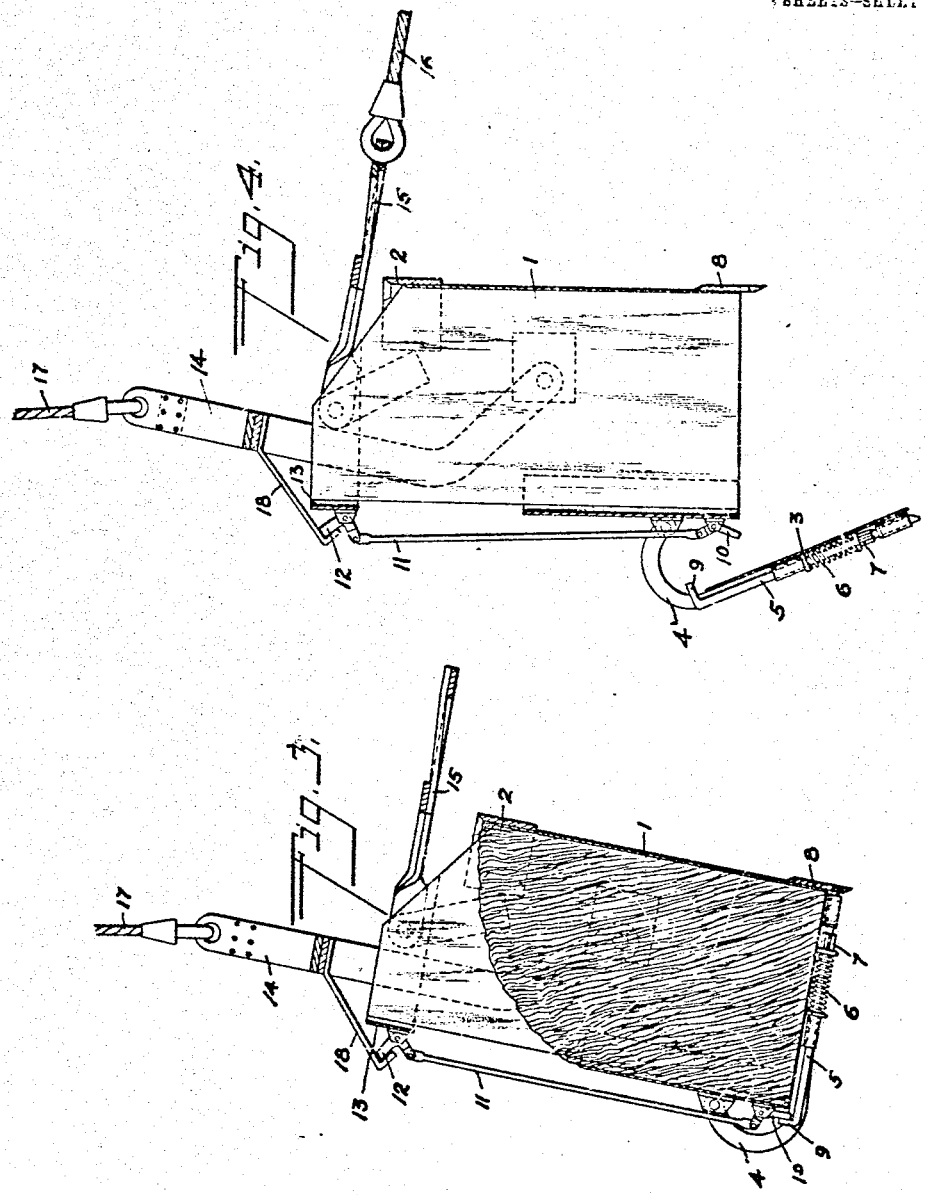

CHARLES J. REISE, OF OMAHA, NEBRASKA.

EXCAVATING-SHOVEL.

955,285. Specification of Letters Patent. Patented Apr. 19, 1910.

Application filed February 15, 1910. Serial No. 544,086.

*To all whom it may concern:*

Be it known that I, CHARLES J. REISE, a citizen of the United States, and a resident of Omaha, in the county of Douglas and State of Nebraska, have invented certain new and useful Improvements in Excavating-Shovels, of which the following is a specification.

My invention relates to excavating shovels of the class adapted for operation through two flexible connections, such as cables, the one connection being used to hoist the shovel when loaded, and the other being used to pull the shovel along the ground to load the same, and also to control the dumping thereof.

It is the object of my invention to provide a shovel of this class which may be accurately controlled as to the location at which the same is dumped and in which a relatively slight tension upon the draft line will be sufficient to prevent dumping thereof.

Constructions embodying my invention are illustrated in the accompanying drawings, in which—

Figure 1 is a side elevation of the shovel, in loading position, Fig. 2 is a rear elevation of the same, Fig. 3 is a section thereof when loaded and near the dumping position, and Fig. 4 is a similar view showing the parts in full dumping position.

The main body of the shovel comprises a shell 1 of approximately rectangular cross-section but preferably having the bottom slightly rounded as shown, the shell being open at the front and a portion of the top thereof, being provided at its lower front edge with a cutting-blade 2 and at its rearward end with a swingable door 3. The door 3 is hinged by means of the curved bars 4 to the top of the shell near the rearward end thereof, and is provided with a latch-bar 5 vertically slidable in suitable guides arranged on the rearward side thereof. The latch-bar is normally pressed downwardly by means of a spring 6 which engages a collar 7 clamped upon the latch-bar and adjustable thereon to vary the compression of the spring. The lower end of the bar is beveled to form a latch adapted to be engaged with the latch-plate 8 secured at the lower rearward end of the shell 1, and thus to retain the door in closed position.

The upper end of the latch-bar has a forwardly-turned hook portion 9 adapted for engagement with one arm of a small bell-crank 10 which is pivoted on the upper side of the shell. The other arm of said bell-crank is connected by means of a rod 11 with a second bell-crank 12 pivoted on the cross-piece 13 near the front end of the shell. A hoisting-bail 14 is pivotally connected with the sides of the shell at points such that when the shovel is loaded the pivotal axis will pass below and slightly in front of the center of gravity thereof. By a suitable design, approximately as shown, the shovel may be so proportioned that when empty the pivotal axis will pass substantially below the center of gravity thereof.

The draft-bail 15 is connected with the shovel above and in front of the edge of the cutting-blade 2, and above the pivotal axis of the hoisting-bail so that when the shovel is wholly or partly suspended from the hoisting-bail a pull upon the draft-bail will tend to tilt the front part of the shovel slightly downward and cause the same to cut at a suitable angle into the material to be excavated.

The shovel is loaded by dragging the same along in a substantially horizontal position by suitable tension upon the draft line 16 connected with the bail 15. After the shovel is loaded it is hoisted by suitable tension upon the hoisting line 17 connected with the bail 14, and swung to the desired dumping location, a certain tension being meanwhile maintained upon the draft line sufficient to prevent the shovel tilting backward to a vertical position. It is not necessary that the shovel during the hoisting operation be held at or near a horizontal position by tension upon the draft line, as it may be permitted to tilt backward to a position such as shown in Fig. 3 before it will be caused to dump. When the desired dumping location has been reached all tension upon the draft line is released and the shovel is thus permitted to tilt to the position shown in Fig. 4, at which the front arm of the bell-crank 12 is engaged by the releasing hook 18 carried by the bail 14 at the position shown. Movement of said bell-crank 12 is communicated through the rod 11 to the bell-crank 10, and the latter, by pulling upon the hook portion 9 of the latch-bar, disengages the lower end thereof from the latch-plate 8 so that the door 3 is permitted to swing downward and the contents of the shovel to be discharged by gravity therefrom. After the shovel is dumped, tension upon the draft line returns the same to the horizontal position and causes the door 3 to return by gravity to its closed position at which the latch-bar again engages the plate 8 to retain the door in closed position, and the filling operation may be repeated.

It will be noted that in the use of my shovel the dumping location thereof may be accurately gaged, since the same may be swung to the exact location desired and then caused to dump by a very additional relaxation of the tension upon the draft line, so that such release of tension upon the draft line need cause but little change in the location of the shovel. It will also be noted that the "spill" is confined practically to a space the same as the cross-section of the shovel, since the door 3 when released will open very quickly and permit the contents of the shovel to be discharged straight downward.

Now, having described my invention, what I claim and desire to secure by Letters Patent is:

1. An excavating shovel comprising a shell open at the front end, a swingable door arranged at the rearward end thereof, a latch for holding the door in closed position, hoisting means pivotally connected with the shell on an axis such that when loaded the shell will tend to tilt backward, draft rigging connected with the front part of the shell, and means for releasing the latch operatable by backward tilting of the shell to a certain definite position.

2. An excavating shovel comprising a shell open at the front end, a door arranged at the rearward end thereof, the door being swingably connected with the shell so as to close by gravity when the shell is in horizontal position, a latch arranged to hold the door in closed position, hoisting means pivotally connected with the shell on an axis such that when loaded the shell will tend to tilt backward, draft rigging connected with the shell so that tension thereon tends to turn the shell to a substantially horizontal position, and means for releasing the latch operatable by backward tilting of the shell to a predetermined position.

3. In an excavating shovel, a shell open at the front end, a door arranged at the rearward end thereof and swingably connected therewith so as to close by gravity when the shell is in a horizontal position, a latch arranged to hold the door in closed position, hoisting means pivotally connected with the shell on an axis such that when loaded the shell will tend to tilt backward, draft rigging connected with the shell so that tension thereon will tend to turn the shell to a substantially horizontal position, and means for releasing the latch comprising an element normally connecting with the latch, connecting devices, and a releasing member carried by the hoisting means and engageable with said connecting devices when the shell is tilted backward to a predetermined position.

4. In an excavating shovel, a receptacle open at one end and having a cutting-blade at one side of said open end, a door arranged at the other end and pivotally connected therewith, spring-pressed means arranged to retain the door in closed position, hoisting means pivotally connected with the receptacle on an axis such that it will tend when loaded to tilt toward the end having the door, draft devices arranged for pulling the receptacle with the open end forward, and means for releasing the spring-pressed door-retaining means, said releasing means being operatable by the tilting of the receptacle to a predetermined position.

5. In an excavating shovel, a shell open at the front end and having a cutting-blade at one side of said open end, a door arranged at the rearward end of the shell and pivotally connected with the shell on an axis such that when the shell is in horizontal position the door will tend to close by gravity, a yieldably-pressed latch for retaining the door in closed position, a hoisting-bail pivoted to the shell on an axis such that when loaded the shell will tend to tilt backward to a vertical position, a draft-bail connected with the forward part of the shell and in such relation to the hoisting-bail axis that a pull on said draft-bail tends to turn the shell to a substantially horizontal position, a member carried by the hoisting-bail, and means connecting with the latch and arranged to engage said member on the hoisting-bail when the shell is tilted backward and to be actuated thereby to release the latch.

In testimony whereof I have hereunto subscribed my name in the presence of two witnesses.

CHARLES J. REISE.

Witnesses:
D. O. BARNELL,
ROY G. KRATZ.